United States Patent [19]

Boston, III

[11] 4,177,573
[45] Dec. 11, 1979

[54] VARIABLE ANGLE APERTURE CARD

[76] Inventor: James D. Boston, III, 565 Chantilly Dr., Sierra Vista, Ariz. 85635

[21] Appl. No.: 913,460

[22] Filed: Jun. 7, 1978

[51] Int. Cl.² ............................................. G01C 3/00
[52] U.S. Cl. ..................................... 33/277; 33/1 K
[58] Field of Search ................................. 33/1K, 277

[56] References Cited

U.S. PATENT DOCUMENTS

| 665,615 | 1/1901 | Mellen | 33/277 |
|---|---|---|---|
| 685,839 | 11/1901 | Heger | 33/277 |
| 940,504 | 11/1909 | Brayton | 33/277 |
| 2,193,518 | 3/1940 | Lubin | 33/1 K |
| 2,474,466 | 6/1949 | Carling | 33/277 |
| 2,669,783 | 2/1954 | Hegel | 33/277 |

*Primary Examiner*—Steven L. Stephan
*Attorney, Agent, or Firm*—W. Britton Moore

[57] ABSTRACT

A variable angle aperture card includes an elongated flat rule foldable compactly and unfolded to provide a horizontal rule with a longitudinal slot with a slide member having a foldable vertically positionable aperture card thereon with a generally rectangular viewing opening therein of a standard photographic print size, which card is slidably adjustable in the slot. Degree of Acceptance and Equivalent Lens Focal Length scales are adhered to the rule on either side of the slot, so that the aperture card is adjustable to a position thereon properly framing the subject, whereat the photographer reads from the scales the angle of view for different camera formats, and determines which lens must be used to photograph the subject from the position at which the framing was made. The combined rule and aperture card may be folded flat for transportation and storage.

5 Claims, 8 Drawing Figures

VARIABLE ANGLE APERTURE CARD

This invention relates to a variable angle aperture card for use by experienced photographers in framing a picture to be photographed to determine the best camera equipment required and selection of lens that will effectively isolate the picture.

BACKGROUND OF THE INVENTION

Before taking a photograph, a photographer must first determine the proper combination of the picture, and the camera equipment required to best take that picture, which principally consists in selecting the lens that can best isolate the subject.

The amount of thought and knowledge that a photographer requires to make these decisions varies widely with the type of equipment available and his level of experience. For instance, a beginner with an inexpensive Instamatic type camera sees something he likes, points his camera thereat and snaps the shutter, and generally experiences a low level of success when the photographs are returned from the photo processor, because his lack of training in composition has not taught him to isolate the element that he likes when taking the picture, and the camera design does not allow for lens changes. Needless to say, the present variable angle aperture card will be useless to this type of photographer, as the information provided thereby is incomprehensible.

On the otherhand, there is the serious amateur or professional photographer who understands the basic rule of composition, i.e., how to isolate the essential element of a picture from its surroundings, and who has a camera system available for a given scene, i.e., wide angle, normal, telephoto. This type of photographer has the task of drawing a mental frame around a desired subject, and then, trying to duplicate this mental frame in the view finder of the camera, by changing lenses or camera positions. Often, several lenses must be tried from several positions, which is physically tedious and mentally frustrating to the photographer, and is hard on equipment, since the lens mounts are strained through frequent changing, and camera bodies are opened to dust more often than necessary.

The present variable angle aperture card is specifically designed for this more experienced type of photographer. By so using the same, and without touching his camera and lenses, the photographer may frame the subject with a frame that delimits standard 4"×5", and other proportionate enlargement sizes and photo dimensions. This indicates what lens must be used from the particular measuring position to take the photograph, and reduces the fumbling and confusion that all photographers encounter, particularly with landscape photography, as well as equipment wear.

It has heretofore been proposed to utilize an open frame as a guide to locate the position for viewing a scene or object to produce the best arrangement, composition, and perspective of a picture to be reproduced therefrom by photography, such as, that shown in U.S. Pat. to Hegel No. 2,669,783. However, in such device, the dimensions of the aperture card are not fixed, but are adjustable, so that the width of the aperture is the baseline, such as the baseline in an isosceles triangle, and this width is changeable, it follows that the distance from the baseline to the apex must also change, if the angle at the apex (angle of view) of the two cotangent sides of the triangle is to remain the same. Accordingly, it is impossible to graduate the longitudinal scale on the slide bar of this prior art device in degrees, in that the changing baseline will cause the actual angle of view to change at a given distance from the apex, as the baseline changed. Therefore, the position of the aperture cannot be correlated with the lens focal length in any camera format, because the angle of view, through the aperture, is the basis for correlation.

PRESENT INVENTION

Accordingly, the principal object of the present invention is to provide a variable angle aperture card wherein the aperture is fixed to furnish a negative image that can be enlarged directly to standard photo processor dimensions, i.e., 4"×5", etc.

Another object is the provision of a variable angle aperture card with a fixed opening designed to show both horizontal and vertical 4"×5" proportion compositions without adjustment.

A further object is to provide a variable angle aperture card hingedly mounted on a slide arranged in an elongated slot of a two-part foldable rule with angle or degree of acceptance and equipment lens focal length scales thereon enabling the photographer to note changes in the angle of view and permitting him to select the appropriate lens that can best be used.

Still another object is the provision of a variable angle aperture card with a fixed opening and so hingedly mounted on a slide arranged in a slot of a two-part hinged rule wherein the card and rule are foldable flat for storage and transportation.

A still further object is to provide a variable angle aperture card which indicates to a photographer what lens must be used with a given camera from a given location to take a photograph that can be enlarged to standard photo dimensions without undue cropping.

These and other objects and advantages will be apparent as the specification is considered with the accompanying drawings, wherein FIG. 1 is a perspective view of the variable angle aperture card in the position assumed when being used in framing a picture to be photographed;

Figure 1:
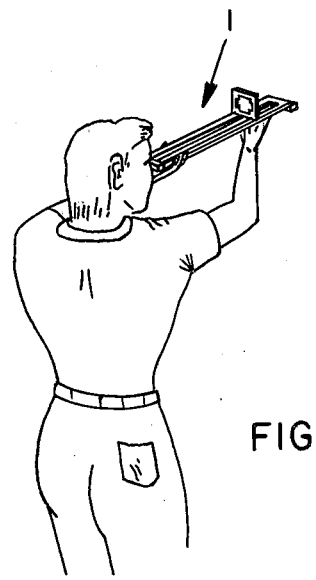
Figure 2:
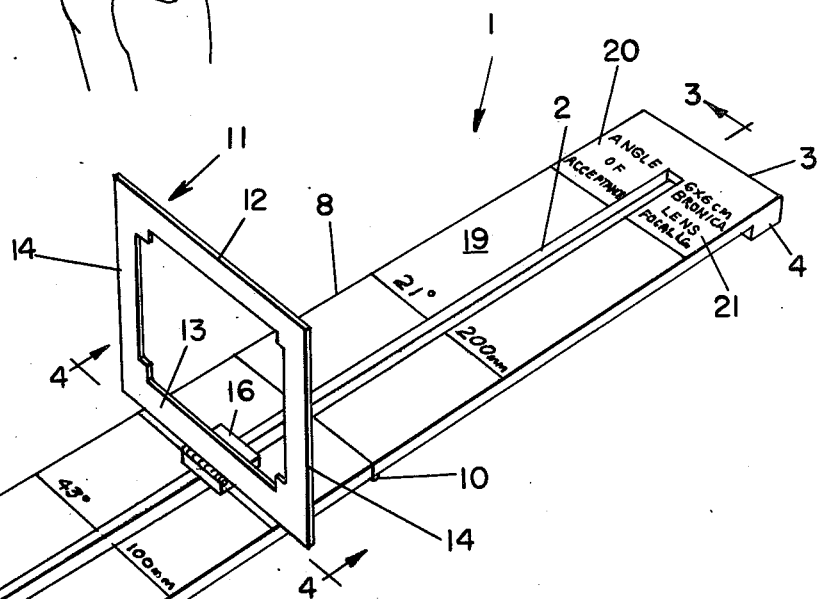
FIG. 2 is a perspective view of the variable angle aperture card in elevated position on the rule ready for picture framing use.
Figure 3:
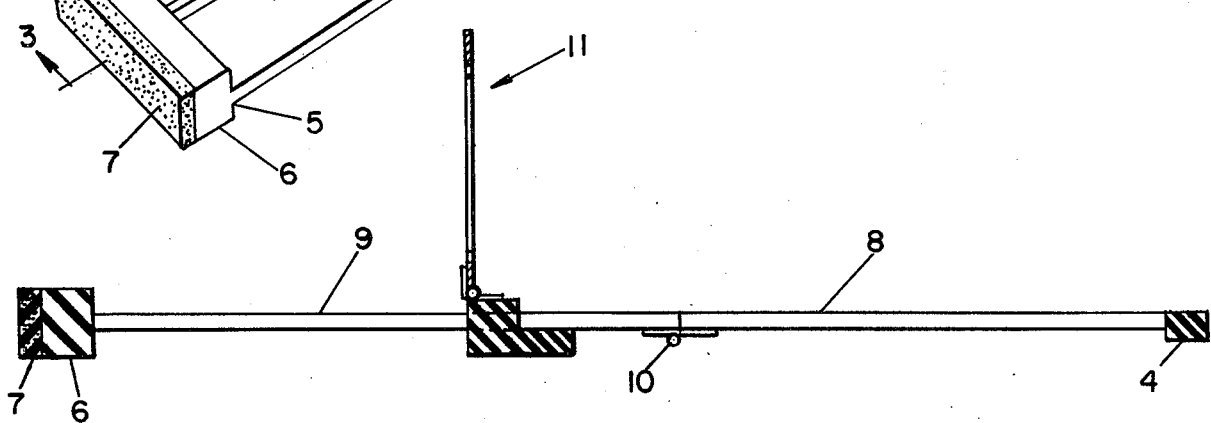
FIG. 3 is a section on the line 3—3 of FIG. 2.
Figures 4, 5, 6:
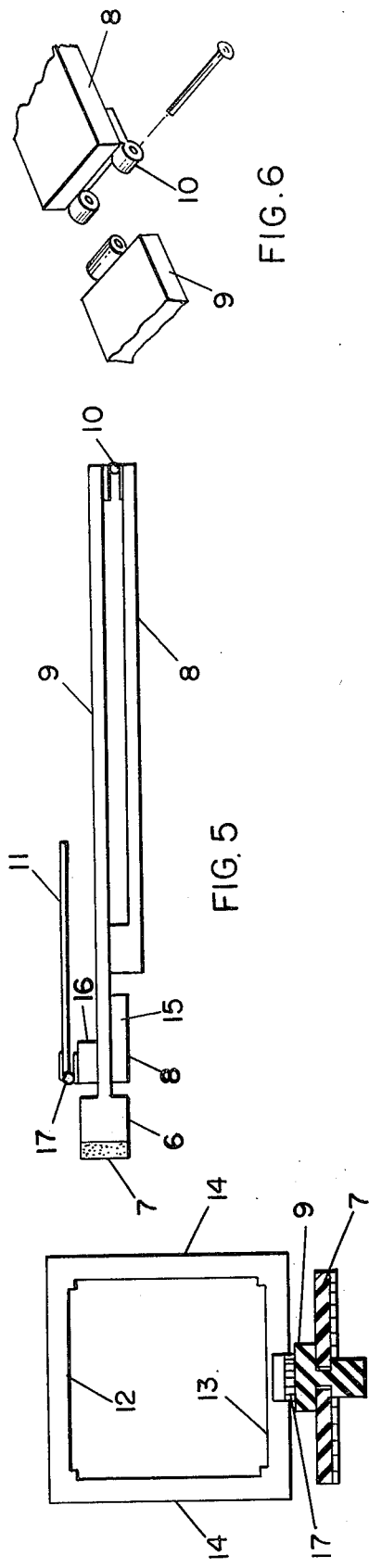
FIG. 4 is a section on the line 4—4 of FIG. 2.
FIG. 5 is a side elevation of the variable angle aperture card and rule in folded position.
FIG. 6 is a perspective view of one form of hinge for interconnecting the rule sections.

Referring more particularly to the drawings, wherein similar reference characters designate like parts throughout the several views, numeral 1 generally indicates an elongated flat bar or ruler, of any suitable light weight material. Bar 1 is formed with an elongated central slot 2 therethrough which extends endwise and terminates short of the ends thereof. One end 3 is downwardly offset to provide a transversely flat supporting foot 4, and the other end 5 is formed with a transversely extending and upwardly and downwardly offset block 6 having a soft cheek engaging pad 7 on the outer face thereof. Block 6, together with foot 4, also functions to support the bar above any planar surface when positioned thereon, in an obvious manner. The bar or ruler is of a size and length to be readily handled and positioned horizontally when extended and held in alignment with the user's eyes for sighting and photographic framing, as best shown in FIG. 1. Bar 1 is divided into forward and rearward sections 8 and 9, which sections are connected for pivotal folding movement by a suitable hinge 10, on the underside thereof, so that the forward section 8 folds under and into parallel engagement with rearward section 9, as shown in FIG. 5.

A generally rectangular viewing aperture card 11, having integral horizontal top 12 and bottom 13, and vertical flat side frame members 14 and being somewhat wider than bar 1, has its bottom frame member 13 hinged, as at 17, to the widened upper end 16 of a slide block 15. The latter is slidable within slot 2 and is retained therein by a base cross member 18. It is important to note that the opening formed by the aperture card frame members fixed to provide a negative image that can be enlarged directly to standard photo processor dimensions, i.e., 4"×5" and proportionate enlargement sizes, and which will show both horizontal and vertical proportion compositions without adjustment, as will hereinafter be better understood. The bar 1 and aperture card slidably and hingedly arranged thereon is designed for asy folding and storage in the user's pocket.

Figure 7:
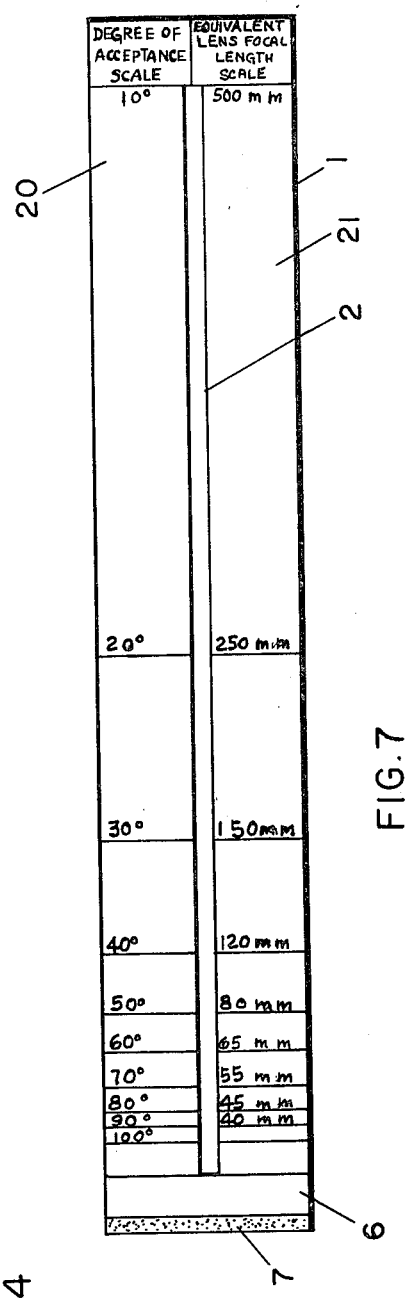
FIG. 7 is a sample variable aperture card chart.

Two relatively narrow linear scales 20 and 21 are flatly disposed on the flat upper face 19 of bar 1, at either side of slot 2, and are suitably removably affixed thereto by adhesive and the like, not shown. One scale 20 is entitled at the upper end thereof "Degree of Acceptance Scale", and the other scale 21 is similarly entitled "Equivalent Lens Focal Length Scale". Each scale is graduated, as shown in FIG. 7, from ten (10°) degrees to ninety (90°) degrees. Lenses of different manufacture have angles of acceptance approximately one (1°) degree different from the values shown herein, but these variations are of little consequence, since a photographer will choose the lens that is closest to the value shown, and most lens choices are usually 20 mm to 100 mm apart. It is further to be understood that for the measurements to be accurate, the slidable viewing aperture card 11 must be of fixed dimensions, such as 70 mm wide, as shown herein.

The Focal Length Scale 21 is selected and applied parallel to the Angle of View Scale 20, according to the camera format being used. When the photographer sees a scene to be photographed, he unfolds the bar 1 and elevates the aperture card 11 and places the cheek pad 7 below his desired viewing eye, and with one hand engages the base 18 of block 15 and slides the aperture card forward and backward in slot 2 until the scene is properly framed vertically and horizontally within the fixed opening thereof. He may then read the Lens Focal Length Scale 21 to determine which lens must be used to photograph the scene from the position at which the framing was made.

Figure 8:
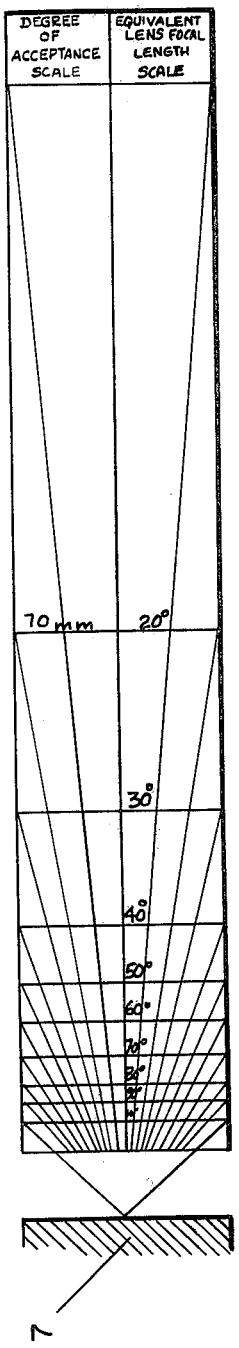
FIG. 8 is a chart showing the principle on which the variable angle aperture card is based.

Referring to FIG. 8, the chart thereof demonstrates the principle on which this variable angle aperture card is based. As a card of a given aperture slidably moves along the bar slot in a straight line, from a fixed point, the angle viewed therethrough changes. If the aperture of the card remains a fixed width, and the viewing point remains fixed, it follows that the angles viewed therethrough may be marked at any desired point along the straight line. In FIG. 8, a 70 mm aperture was selected. If the aperture had been 60 mm wide, then the point along the straight line at which twenty (20°) degrees, for example, could be viewed, would be changed, since the baseline of the isosceles triangle that it forms would be changed. Accordingly, it is most important and essential that the aperture card be of fixed dimensions.

Lenses of different focal length, for a given camera format, have different angles of acceptance (e.g., 2¼"×2¼", 50 mm lens has a 77° angle of acceptance, while a 150 mm lens has a 29° angle of acceptance). Therefore, there is a direct correlation between the position of an aperture, on a fixed line when viewed from a fixed point, and a lens of a given focal length, provided the aperture card's width does not change.

While a preferred embodiment of variable angle aperture card has been illustrated and described, it is to be understood that various changes and improvements may be made therein without departing from the scope and spirit of the appended claims.

What I claim is:

1. In a variable angle aperture card for framing a scene to be photographed and determining the best camera equipment required and selection of lens to isolate that view, an elongated flat bar, said bar being divided into at least two sections, said sections being hinged together for folding, an elongated central slot in said bar extending generally end to end thereof, a rectangular viewing aperture card having fixed horizontal and vertical frame members forming a fixed viewing aperture correlating in size to that of available standard photographic print sizes, slide means arranged for sliding movement lengthwise of said slot, said card being hingedly mounted on said slide means and being foldable relative thereto, degree of acceptance and equivalent lens focal length scales removably and longitudinally affixed to the upper face of said bar on either side of said slot, whereby a photographer may view therethrough to frame the scene and determine from said scales the angle of view for different camera formats and the lens to best photograph the view from the position at which the framing was made.

2. In a variable angle aperture card, according to claim 1, wherein flat supporting means is provided on the underside and at the ends of said bar, and soft cheek engaging pad means is arranged at one end thereof.

3. In a variable angle aperture card, according to claim 1, wherein said scales are adhesively and removably adhered to said bar.

4. In a variable angle aperture card, according to claim 1, wherein said bar is divided into two hinged sections, and one of said sections is foldable under and parallel to said other section, and said hinged aperture card is foldable downwardly against said bar for compact storage purposes.

5. In a variable angle aperture card, according to claim 1, wherein the sliding means for mounting said aperture card includes a slide block arranged in said elongated slot, and said aperture card is hinged to the upper end of said slide block whereby said card may be moved to upright viewing position and foldable downwardly to a position generally parallel to said bar, and said card is movable lengthwise of said slot adjusting said slide block.

* * * * *